(12) United States Patent
Alshatwi et al.

(10) Patent No.: US 9,403,688 B1
(45) Date of Patent: Aug. 2, 2016

(54) METHOD OF PRODUCING BIOGENIC SILICA NANOPARTICLES

(71) Applicant: KING SAUD UNIVERSITY, Riyadh (SA)

(72) Inventors: Ali Abdullah Alshatwi, Riyadh (SA); Jegan Athinarayanan, Riyadh (SA); Vaiyapuri Subbarayan Periasamy, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 6 days.

(21) Appl. No.: 14/617,537

(22) Filed: Feb. 9, 2015

(51) Int. Cl.
*C01B 33/12* (2006.01)
*C01B 33/18* (2006.01)

(52) U.S. Cl.
CPC .................. *C01B 33/18* (2013.01); *C01B 33/12* (2013.01); *C01B 33/126* (2013.01)

(58) Field of Classification Search
CPC ........ C01B 33/126; C01B 33/12; C01B 33/18
USPC .......................................................... 423/335
See application file for complete search history.

(56) References Cited

U.S. PATENT DOCUMENTS

| 5,503,931 | A  * | 4/1996 | Goodman, Sr. ............... 428/402 |
| 8,492,444 | B2   | 7/2013 | Hammond et al. |
| 2009/0148578 | A1 * | 6/2009 | Kondoh et al. ............... 426/531 |
| 2014/0079930 | A1 * | 3/2014 | Canham et al. ............... 428/219 |

OTHER PUBLICATIONS

Lux et al., "*Silification in sorghum (Sorghum bicolor) cultivars with different drought tolerance*", Physologia Plantarum, 2002, vol. 115, pp. 87-92.

* cited by examiner

*Primary Examiner* — Kaj K Olsen
*Assistant Examiner* — James Fiorito
(74) *Attorney, Agent, or Firm* — Richard C. Litman

(57) ABSTRACT

A method of producing biogenic silica nanoparticles comprises pretreating seed hulls of a biogenic source with an acid to form acid-treated seed hulls; placing the acid-treated seed hulls in an autoclave at a temperature greater than 100° C. for about 2 hours under a fixed pressure; isolating the seed hulls; washing the seed hulls with water; air drying the seed hulls; calcining the seed hulls at a temperature range of 500° C. to 700° C. for at least one hour in a furnace to produce biogenic silica nanoparticles. The biogenic silica nano-particles are amorphous and biocompatible possessing a particle sizes in the range of 25-75 nm.

7 Claims, 9 Drawing Sheets

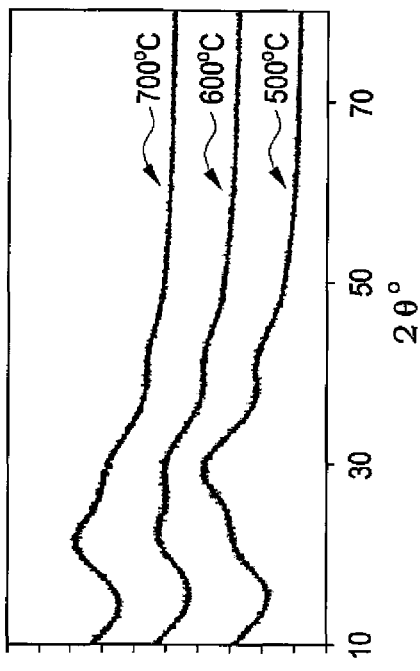
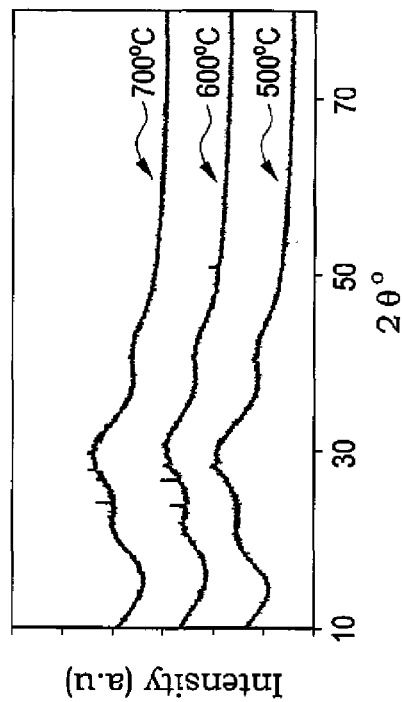
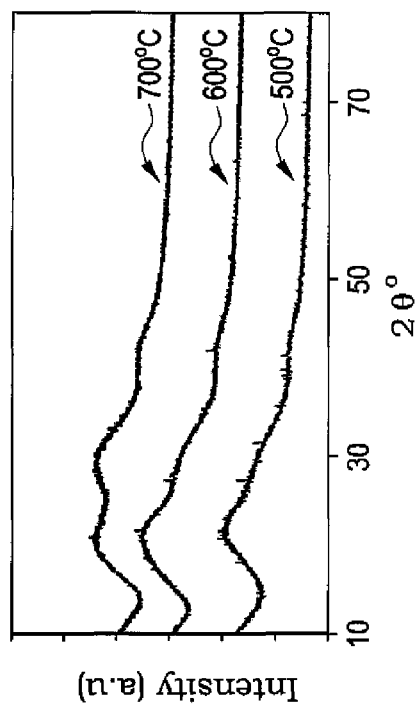
Fig. 1A
Fig. 1B
Fig. 1C

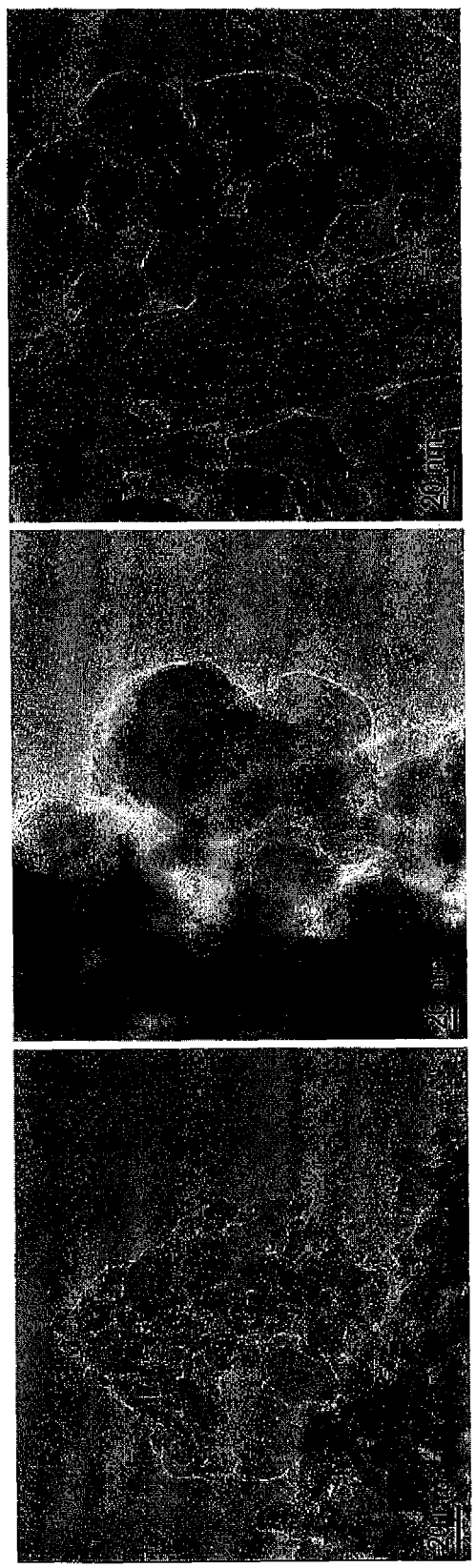

METHOD OF PRODUCING BIOGENIC SILICA NANOPARTICLES

BACKGROUND OF THE INVENTION

1. Field of the Invention

The present invention relates to agri-nanotechnology, and particularly to a method of preparing biogenic silica nanoparticles from the seed hulls of various plants.

2. Description of the Related Art

Nanomaterials, defined as particles with a size of less than 100 nm, have been useful in various industries, including, electrical, textile, medicine, cosmetics, agriculture and food. Nanomaterials have unique physiochemical properties. Silica is the second most abundant element on earth. Silica nanoparticles ($SiO_2$—NPs) have been used in various applications including catalysis, pigments, thin film substrates, thermal insulators, pesticides, food additives, drug delivery, gene therapy, molecular imaging and additives in plastics. Silica plays an important physiological role in plants; as an alleviator of biotic and abiotic stress. Silicon supplement diets have increased the bone mineral density in women, increased type I collagen synthesis, and induced osteoblast differentiation.

Biosilica is a selective inducer of osteoprotegerin expression resulting in inactivation of osteoclast differentiation. Silica inhibits the aluminum uptake in the gastrointestinal tract due to the interaction between aluminum and silica.

Silica nanoparticles ($SiO_2$—NPs) are used in numerous applications and, as a consequence, large quantities are required. Thus, there is a need to develop an easy and economical method to produce $SiO_2$—NPs.

A variety of methods have been used for preparing silica nanoparticles namely, microwave hydrothermal process, flame synthesis, sol-gel process, micro-emulsion method, and combustion synthesis. In large scale production of silica, quartz sand is treated with sodium carbonate at 1300° C. This method is hazardous to the environment because it emits a large quantity of $CO_2$ gas. Moreover, presently there is a major problem in sustainability due to the generation of a large quantity of agricultural waste. It has been estimated that 140 billion metric tons of agricultural waste is generated every year worldwide due to agricultural production and processing. However, huge quantity of agricultural waste management is difficult and represents a major challenge. The improper usage of agricultural wastes creates an ecological contamination. Therefore, it would be desirable to convert agricultural waste to valuable products in an efficient way for industrial use.

Thus, a method of producing biogenic silica nanoparticles from the bio-precursors of cultivated plants solving the aforementioned problems is desired.

BRIEF DESCRIPTION OF THE DRAWINGS

FIG. 1A shows an X-ray Diffraction (XRD) pattern of biogenic silica nanoparticles prepared from *Elucine corcana* using calcination temperatures of 500° C., 600° C., and 700° C.

FIG. 1B shows an X-ray Diffraction (XRD) pattern of biogenic silica nanoparticles prepared from *Sorghum bicolor* using calcination temperatures of 500° C., 600° C., and 700° C.

FIG. 1C shows an X-ray Diffraction (XRD) pattern of biogenic silica nanoparticles prepared from *Pennisetum glaucum* using calcination temperatures of 500° C., 600° C., and 700° C.

FIG. 3A shows the Transmission Electron Micrograph (TEM) image of the biogenic silica nanoparticles prepared from *Sorghum bicolor* husk using a calcination temperature of 500° C.

FIG. 3B shows the Transmission Electron Micrograph (TEM) image of the biogenic silica nanoparticles prepared from *Sorghum bicolor* husk using a calcination temperature of 600° C.

FIG. 3C shows the Transmission Electron Micrograph (TEM) image of the biogenic silica nanoparticles prepared from *Sorghum bicolor* husk using a calcination temperature of 700° C.

FIG. 4A shows the Transmission Electron Micrograph (TEM) image of the biogenic silica nanoparticles prepared from *Pennisetum glaucum* husk using a calcination temperature of 500° C.

FIG. 4B shows the Transmission Electron Micrograph (TEM) image of the biogenic silica nanoparticles prepared from *Pennisetum glaucum* husk using a calcination temperature of 600° C.

FIG. 4C shows the Transmission Electron Micrograph (TEM) image of the biogenic silica nanoparticles prepared from *Pennisetum glaucum* husk using a calcination temperature of 700° C.

Similar reference characters denote corresponding features consistently throughout the attached drawings.

SUMMARY OF THE INVENTION

Figures 2A, 2B, 2C:
FIG. 2A shows the Transmission Electron Micrograph (TEM) image of the biogenic silica nanoparticles prepared from *Eleusine coracana* husk using a calcination temperature of 500° C.
FIG. 2B shows the Transmission Electron Micrograph (TEM) image of the biogenic silica nanoparticles prepared from *Eleusine coracana* husk using a calcination temperature of 600° C.
FIG. 2C shows the Transmission Electron Micrograph (TEM) image of the biogenic silica nanoparticles prepared from *Eleusine coracana* husk using a calcination temperature of 700° C.

A method of producing biogenic silica nanoparticles includes pretreating seed hulls of a plant with an acid to form acid-treated seed hulls, placing the acid-treated seed hulls in an autoclave at a temperature greater than 100° C. for about 2 hours under pressurized conditions, isolating the seed hulls, washing the seed hulls with water, air drying the seed hulls, calcining the seed hulls at a temperature range of about 500° C. to about 700° C. for at least one hour in a furnace to produce biogenic silica nanoparticles. The plant can be millet (*Eleusine coracana*), sorghum (*Sorghum bicolor*), and pearl millet (*Pennisetum glaucum*). The biogenic silica nanoparticles are amorphous and biocompatible. The biogenic silica nanoparticles range from about 20 nm to about 75 nm in size.

DETAILED DESCRIPTION OF THE PREFERRED EMBODIMENTS

A method of producing biogenic silica nanoparticles includes pretreating seed hulls of a plant with an acid to form a mixture, placing the mixture in an autoclave at a temperature greater than 100° C. for about 2 hours under pressurized conditions, isolating the seed hulls, washing the seed hulls with water; air drying said seed hulls, calcining the seed hulls at a temperature range of about 500° C. to about 700° C. for at least one hour in a furnace to obtain biogenic silica nanoparticles. The plant can be millet (*Eleusine coracana*), sorghum (*Sorghum bicolor*), and pearl millet (*Pennisetum glaucum*). The biogenic silica nanoparticles are amorphous and biocompatible. The biogenic silica nanoparticles range from about 20 nm to about 75 nm in size.

Millet, (*Eleusine coracana*), sorghum (*Sorghum bicolor*), and pearl millet (*Pennisetum glaucum*) are important traditional crops in Saudi Arabia and elsewhere. The seed hulls of these plants contain approximately 5-15% of silica, 80-85% of organic materials and traceable quantity of metal ions. The hulls are the natural shells or sheaths that form the outer covering of the grains, which are the seeds. They are removed during the refining process and remain as low value by-product and agricultural waste.

The hulls of the plant seeds can be ground and sieved. Then, as mentioned above, the hulls can be treated with an acid to form an acid-treated mixture. The acid can be, for example, 1N hydrochloric acid. The acid-treated mixture can be heated at a temperature greater than 100° C. For example, the acid-treated mixture can be transferred to an autoclave and maintained at 120° C. for about 2 hours under pressurized conditions, e.g. 15 lbs.

The elemental profile results of the biogenic silica nanoparticles produced in accordance with the present method indicated a purity of 99.53%. The biogenic silica nanoparticles produced according to the present method are amorphous and range in size from about 25 nm to about 75 nm. The biogenic silica nanoparticles produced according to the present method are non-toxic and biocompatible with human mesenchymal stem cells (hMSc). The present method for providing biogenic silica nanoparticles is simple, cost-effective, and well-suited for large scale production. Accordingly, the biogenic silica nanoparticles produced according to the present methods can be useful in nutraceutical and dietary supplements, bone tissue engineering, anti-caking agents, excipients associated with the food industry, catalysts, water treatment and in other biomedical applications. The selected plant seed hulls or bio-precursors described herein can be used for synthesis of various materials including silica nanocomposites and zeolites. The following examples will further illustrate the invention but are not to be construed as limiting its scope.

Example 1

Materials and Methods

The seed hulls of *Eleusine coracana*, *Sorghum bicolor*, and *Pennisetum glaucum* were collected from a post-harvesting mill, in Karur, Tamil Nadu (India). The collected materials were ground and sieved using 18 mesh size for further studies. Total silica content of plant's seed hulls was quantified adopting AOAC procedures.

Example 2

Cell Culture

Human mesenchymal stem cells (hMSc) were obtained from Thermo Scientific Hyclone (USA). The cells were cultured in DMEM medium supplemented with 10% bovine serum, 100 μg/mL of penicillin and 100 μg/mL of streptomycin in 96-well culture plates at 37° C. in a humidified atmosphere containing 5% $CO_2$. All experiments were performed with cells from 15 passages or less.

Example 3

Preparation of Biogenic Silica Nanoparticle from Plant Materials

Approximately 100 grams of the selected seed hulls were mixed with 500 ml of 1N HCl in separate conical flasks. These mixtures were transferred to an autoclave and maintained at 120° C. for 2 hours under pressurized (15 lb) conditions. The acid-pretreated plant's seed hulls was isolated and washed with Milli-Q water to remove the hydrochloric acid. Residue from the acid-pretreated seed hulls were dried and subsequently calcinated at temperatures of 500° C., 600° C., and 700° C. for 1 hour using a muffle furnace.

Example 4

Characterization of the Biogenic Silica Nanoparticles

The crystalline nature of the obtained biogenic silica nanoparticles were investigated using powder XRD (JEOL model). The prepared biogenic silica powders were dispersed in pure ethanol and ultrasonicated before transmission electron micrograph (TEM) characterization. The morphologies and sizes of the samples were examined using a JEOL transmission electron microscope (TEM) at an accelerating voltage of 200 kV. Biogenic silica samples derived at 700° C. were used for analysis of biological properties.

FIG. 1A shows the XRD pattern of the biogenic silica nanoparticles derived from *Eleusine coracana* plant seed hulls. Broad XRD peaks can be seen in FIG. 1A, with a 2θ value between 15-35°, which indicates that the formed silica nanoparticles are amorphous. FIGS. 1B and 1C show the XRD pattern of biogenic silica nanoparticles derived from *Sorghum bicolor* and *Pennisetum glaucum*, respectively. The results show broad XRD peaks corresponding to amorphous silica nanoparticles. The broadness of the XRD peaks confirms that the prepared biogenic silica is nanoscale in size.

The size and morphology of the prepared biogenic silica nanoparticles were analyzed using transmission electron microscope (TEM). FIGS. 2A-2C show the TEM images of the biogenic silica nanoparticles derived from *Eleusine coracana* using calcination temperatures of 500° C. (FIG. 2A), 600° C. (FIG. 2B), and 700° C. (FIG. 2C). The biogenic silica nanoparticles are spherical and about 25-75 nm in size, but the particles are aggregated. FIGS. 3A-3C show the TEM images of the prepared biogenic silica nanoparticles from *Sorghum bicolor* using calcination temperatures of 500° C. (FIG. 3A), 600° C. (FIG. 3B), and 700° C. (FIG. 3C). The indicate silica nanoparticles are 20-60 nm in size and aggregated. It was discovered that when the calcination temperature increased, the particle size also increased. This result suggests that calcination temperature plays a vital role in biogenic silica nanoparticles formation. FIGS. 4A-4C show the TEM images of the *Pennisetum glaucum* biogenic silica using calcination temperatures of 500° C. (FIG. 4A), 600° C. (FIG. 4B), and 700° C. (FIG. 4C). The TEM images confirmed that the prepared particles were about 40-60 nm, and spherical in shape. However, the particle size and shape varied based on their bio-precursor and calcination temperatures. The purity of the prepared biogenic silica was analyzed using ICP-OES. The results suggested that prepared samples are highly pure (Table 1).

TABLE 1

Biogenic Silica Nanoparticles prepared from seed hulls of various plant materials.

| Plants | Silica in seed hulls (%) | Calcination temperature | Biogenic silica nanoparticles (%) |
|---|---|---|---|
| *Eleusine coracana* | 6.8 | 500° C. | 99.123 |
| | | 600° C. | 99.28 |
| | | 700° C. | 99.54 |
| *Sorghum bicolor* | 7.8 | 500° C. | 98.933 |
| | | 600° C. | 98.97 |
| | | 700° C. | 99.32 |
| *Pennisetum glaucum* | 6.1 | 500° C. | 99.53 |
| | | 600° C. | 99.58 |
| | | 700° C. | 99.64 |

Example 5

Cell Viability Assay

The biocompatibility of the prepared biogenic silica nanoparticles were assessed by an MTT assay. The hMSc were seeded at a density of $1\times10^4$ cells per well in 200 μL of fresh culture medium and incubated overnight at 37° C. and 5% $CO_2$. After overnight growth, the cells were treated with different concentrations (25-400 ng/mL) of well characterized biogenic silica nanoparticles for 24 and 48 h. After incubation, 20 μL of MTT solution [5 mg/mL in phosphate-buffered saline (PBS)] was added to each well. The plates were wrapped with aluminum foil and incubated for 4 h at 37° C. The plates were centrifuged, and the purple formazan product was dissolved by the addition of 100 μL of DMSO to each well. The absorbance was monitored at 570 nm (measurement) and 630 nm (reference) using a 96-well plate reader (Bio-Rad, CA, USA). Data were collected for tetraplicates of each biogenic silica nanoparticles concentration, and these data were used to calculate the mean. The percent inhibition was calculated from these data by the following formula:

Cell viability=Mean *OD* of untreated cells (control)−
Mean *OD* of treated cells×100/Mean *OD* of
untreated cells (control)

Figure 5A:
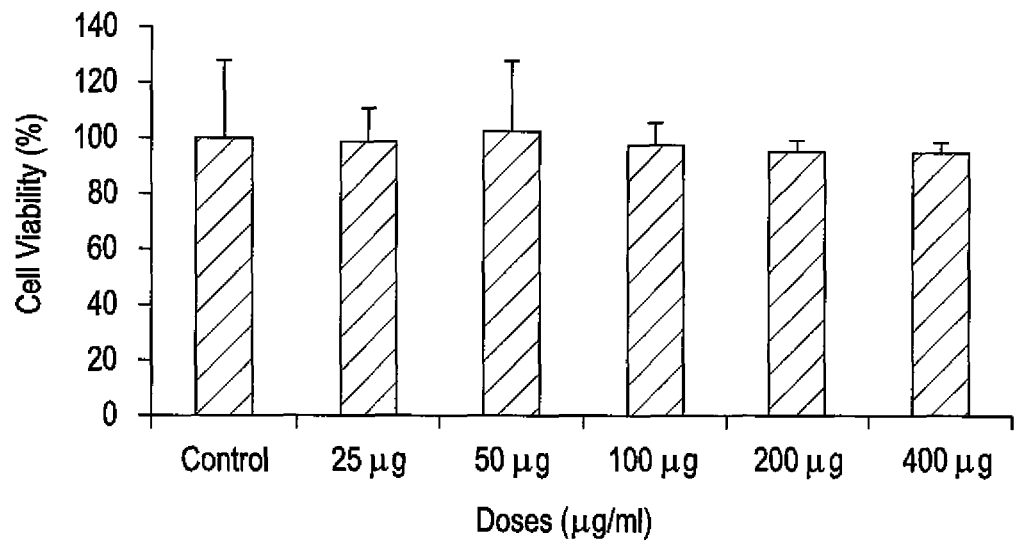
FIG. 5A shows a graph of results of the cell viability assay of human mesenchymal stem cells treated with biogenic silica nanoparticles prepared using *Eleusine coracana*.
Figure 5B:
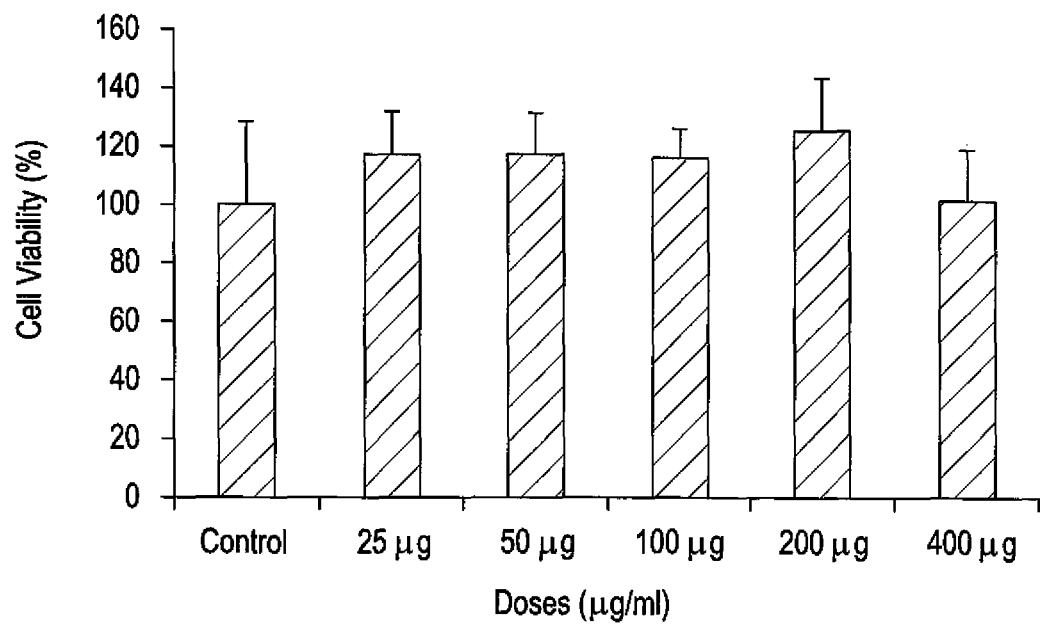
FIG. 5B shows a graph of results of the cell viability assay of human mesenchymal stem cells treated with biogenic silica nanoparticles prepared using *Sorghum bicolor*.
Figure 5C:
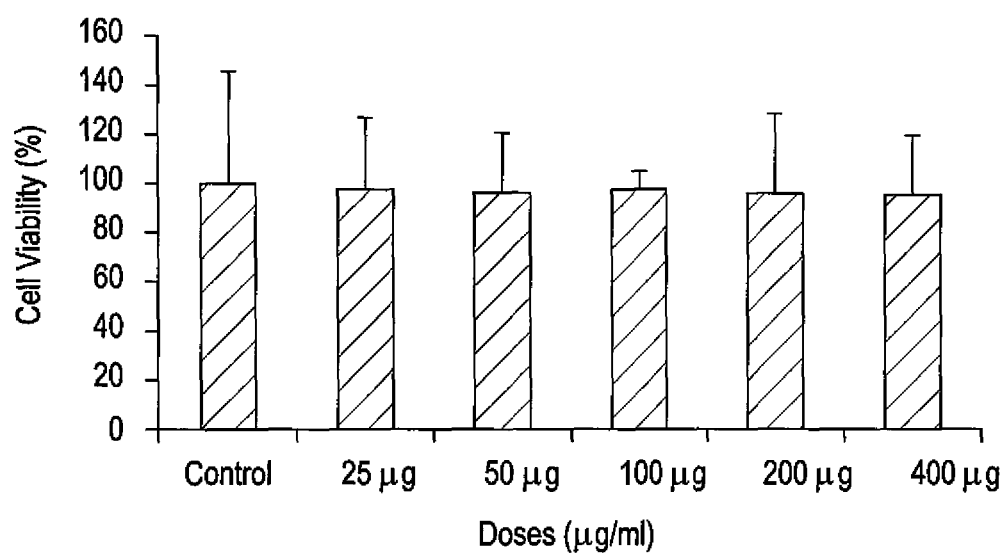
FIG. 5C shows a graph of results of the cell viability assay of human mesenchymal stem cells treated with biogenic silica nanoparticles prepared using *Pennisetum glaucum*.

FIGS. 5A-5C shows results of the cell viability assay of human mesenchymal stem cells (hMSC) treated with biogenic silica nanoparticles prepared using (a) *Eleusine coracana* (FIG. 5A), (b) *Sorghum bicolor* (FIG. 5B), and (c) *Pennisetum glaucum* (FIG. 5C). The hMSC were exposed to various concentrations (25, 50, 100, 200 and 400 μg/mL) of biogenic silica nanoparticles derived from various plant seed hulls for 24 hours. Ultimately, there was no difference between the control and the low concentration group, whereas slight changes were observed at the high concentration. Because the cell viability was greater than 95% at the high concentrations, the results indicate that prepared biogenic silica nanoparticles exhibited biocompatibility with hMSCs.

Example 6

Cellular Morphology Analysis

The nuclear and cytoplasmic morphology of the hMSc cells were analyzed after treatment with biogenic silica nanoparticles for 24 and 48 hours. Control cells were grown in the same manner in the absence of biogenic silica nanoparticles. The cells were trypsinized and fixed with methanol. The cell nuclei were then stained by treatment with 1 mg/mL propidium iodide (Sigma) at 37° C. for 15 min in the dark. The stained cells were examined under an inverted fluorescence microscope (Carl Zeiss, Jena, Germany). The results are presented as a series of triplicates.

Figure 6:
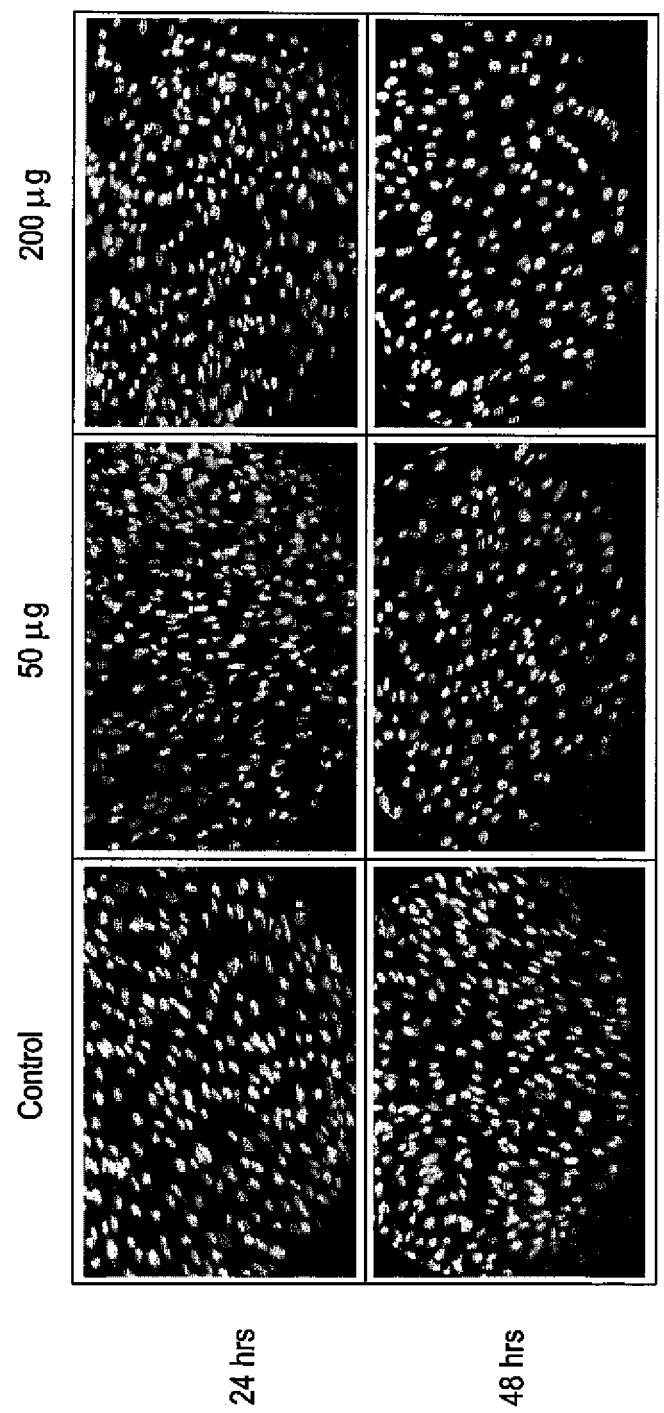
FIG. 6 shows the nuclear morphology of human mesenchymal stem cells treated with *Eleusine coracana* biogenic silica nanoparticles prepared using a calcination temperature of 700° C.
Figure 7:
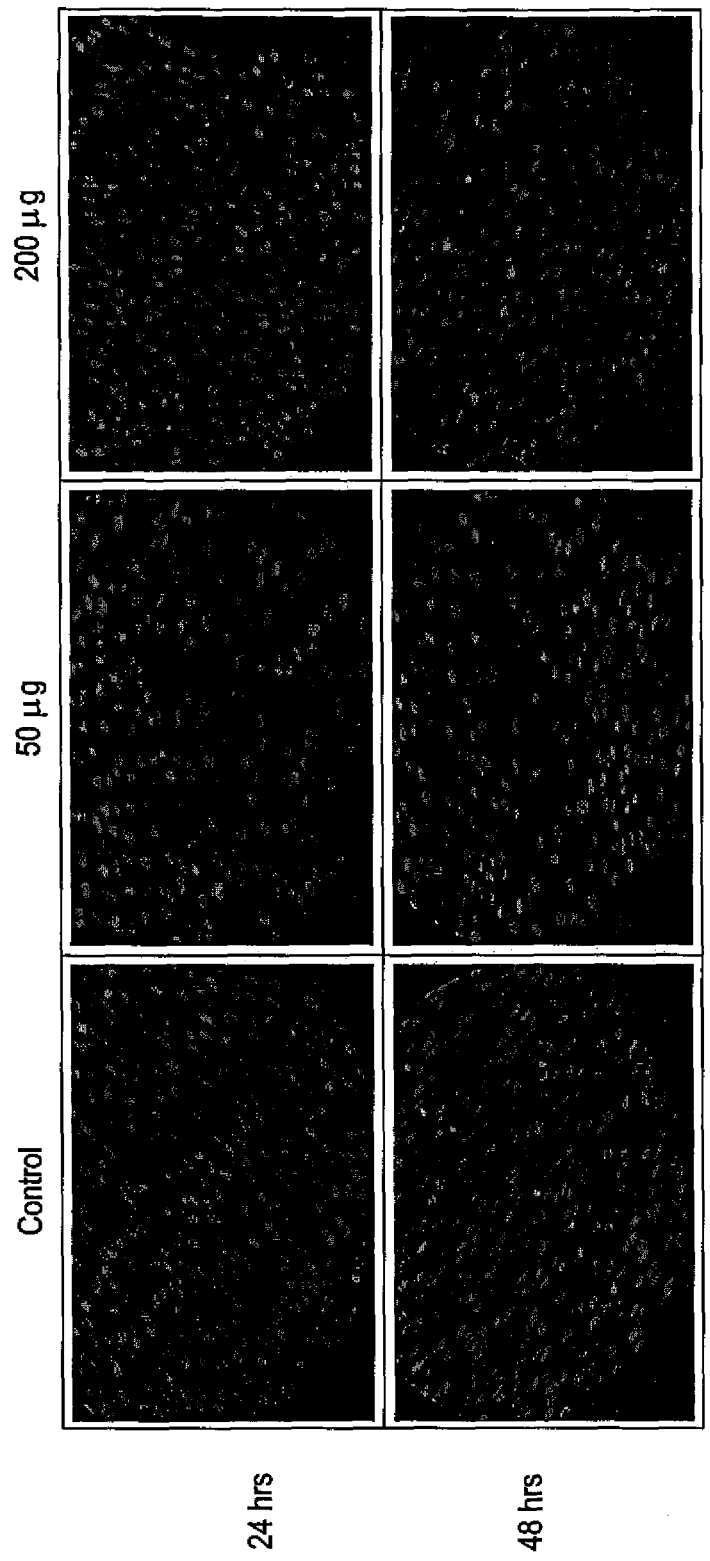
FIG. 7 shows the nuclear morphology of human mesenchymal stem cells treated with *Sorghum bicolor* biogenic silica nanoparticles prepared using a calcination temperature of 700° C.
Figure 8:
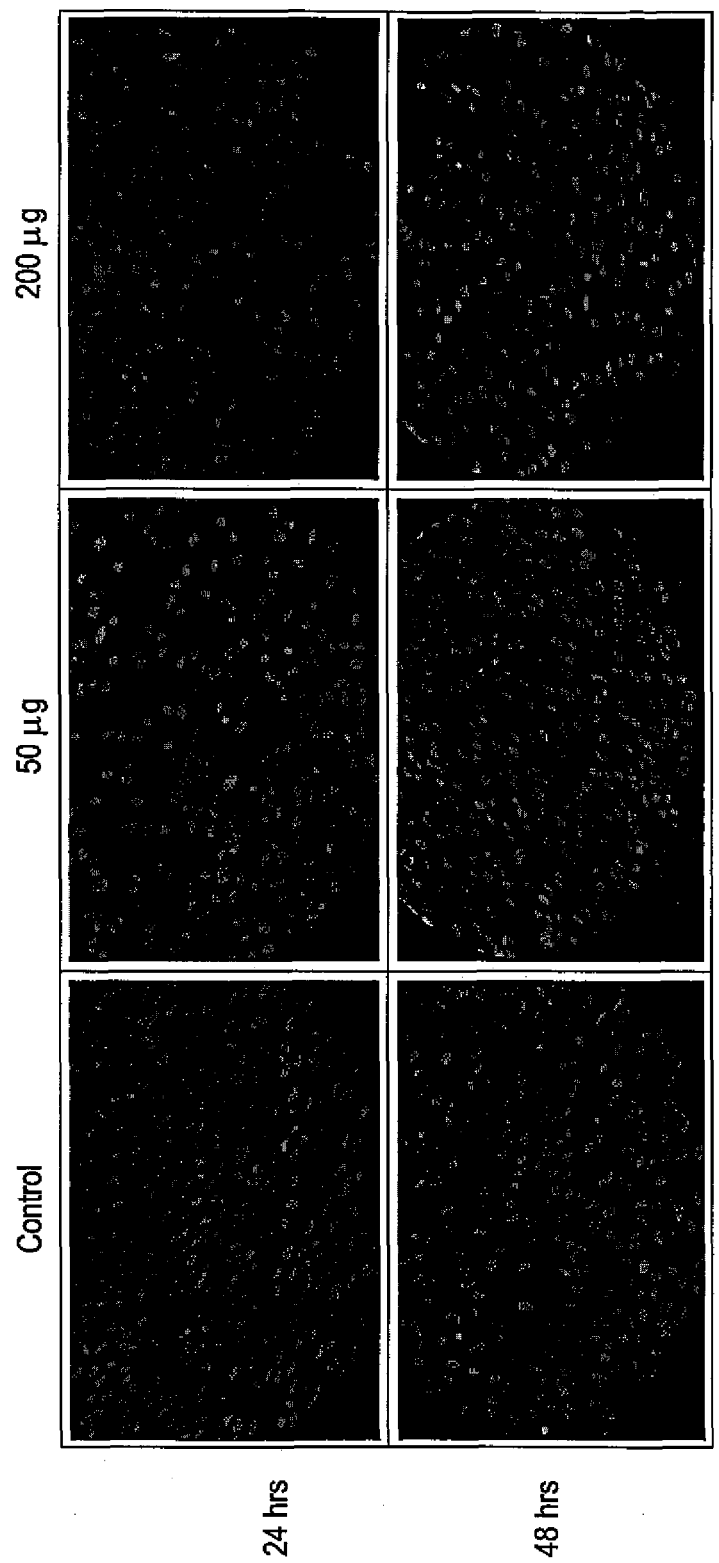
FIG. 8 shows the nuclear morphology of human mesenchymal stem cells treated with *Pennisetum glaucum* biogenic silica nanoparticles prepared using a calcination temperature of 700° C.

FIGS. 6, 7 and 8 show the nuclear morphology of human mesenchymal stem cells (hMSC) treated with biogenic silica nanoparticles derived at 700° C. from seed hulls of *Eleusine coracana* (FIG. 6), *Sorghum bicolor* (FIG. 7) and *Pennisetum glaucum* (FIG. 8) respectively. The images revealed the presence of healthy, round nuclei cells, without any significant changes in cell morphology upon treatment of the hMSCs with the biogenic silica nanoparticles, where Dose-1=50 μg/mL and Dose-2=200 μg/mL for 24 and 48 hours. The observations confirmed that the biogenic silica nanoparticles are non-toxic and biocompatible with hMSCs.

It is to be understood that the present invention is not limited to the embodiments described above, but encompasses any and all embodiments within the scope of the following claims.

We claim:

1. A method of producing biogenic silica nanoparticles comprising:
    separating seed hulls from a plant
    pretreating the separated seed hulls of the plant with an acid to form acid-treated seed hulls;
    heating the acid-treated seed hulls at a temperature greater than 100° C. for about 2 hours under pressurized conditions;
    washing the acid-treated seed hulls with water to remove the acid from the seed hulls;
    drying the seed hulls after removing the acid; and
    calcining the dried seed hulls at a temperature ranging from about 500° C. to about 700° C. for at least one hour in a furnace to produce biogenic silica nanoparticles, wherein
    the plant is selected from the group consisting of *Eleusine coracana, Sorghum bicolor* and *Pennisetum glaucum*, and
    the biogenic silica nanoparticles are between about 10 nm and about 100 nm in size.

2. The method of producing biogenic silica nanoparticles according to claim 1, wherein the acid is 1N hydrochloric acid.

3. The method of producing biogenic silica nanoparticles according to claim 1, wherein the pressurized conditions include about 15 lbs of pressure per square inch.

4. The method of producing biogenic silica nanoparticles from a biogenic source according to claim 1, wherein the acid-treated seed hulls are heated in an autoclave at a temperature of about 120° C.

5. The method of producing biogenic silica nanoparticles according to claim 1, wherein the biogenic silica nanoparticles are between about 20 nm and 75 nm in size.

6. The method of producing biogenic silica nanoparticles according to claim 1, wherein the silica nanoparticles are amorphous.

7. The method of producing biogenic silica nanoparticles according to claim 1, wherein the silica nanoparticles are aggregated.

\* \* \* \* \*